(12) United States Patent
Hirooka et al.

(10) Patent No.: US 6,622,301 B1
(45) Date of Patent: Sep. 16, 2003

(54) PARALLEL PROGRAM GENERATING METHOD

(75) Inventors: Takashi Hirooka, Sagamiihara (JP); Hiroshi Ohta, Kawasaki (JP); Takayoshi Iitsuka, Sagamihara (JP); Sumio Kikuchi, Machida (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/500,079

(22) Filed: Feb. 8, 2000

(30) Foreign Application Priority Data

Feb. 9, 1909 (JP) ........................................... 11-031568

(51) Int. Cl.[7] ................................................ G06F 9/45
(52) U.S. Cl. ........................ 717/149; 717/106; 717/119; 717/160; 712/28; 712/32
(58) Field of Search .......................... 717/149, 136–148, 717/150–161, 106–112, 119, 130–133; 709/201, 205, 213–215, 105; 712/23, 28, 32, 203

(56) References Cited

U.S. PATENT DOCUMENTS 5,230,053 A * 7/1993 Zaiki .......................... 717/150
5,978,583 A * 11/1999 Ekanadham et al. ......... 717/106
6,292,822 B1 * 9/2001 Hardwick .................... 709/105
6,339,840 B1 * 1/2002 Kothari et al. .............. 717/149

OTHER PUBLICATIONS

Chandra et al., Data Distribution Support on Distributed Shared Memory Multiprocessors, Jun., 1997, Sigplan '97 Conference on Programming Language Design and Implementation (PLDI), Las Vegas, NV, pp. 334–335.*
Kandemir et al., Improving locality using loop and data transformations in an integrated framework, Nov. 30, 1998, Microarchitecture MICRO–31, Proceedings 31st ACM/IEEE International Symposium.*
Shih–Davidson, Grouping Array Layouts to reduce communication and improve locality of parallel programs, Jun. 1994, IEEE.*
Sato et al., Program partitioning optimizations in an HPF prototype compiler, Jul. 1996, IEEE.*

* cited by examiner

Primary Examiner—Hoang-Vu Anthony Nguyen-Ba
(74) Attorney, Agent, or Firm—Antonelli, Terry, Stout & Kraus, LLP

(57) ABSTRACT

When converting a sequential execution source program into a parallel program to be executed by respective processors (nodes) of a distributed shared memory parallel computer, a compiler computer transforms the source program to increase a processing speed of the parallel program. First, a kernel loop having a longest sequential execution time is detected in the source program. Next, a data access pattern equal to that of the kernel loop is reproduced to generate a control code to control first touch data distribution. The first touch control code generated is inserted in the parallel program.

14 Claims, 17 Drawing Sheets

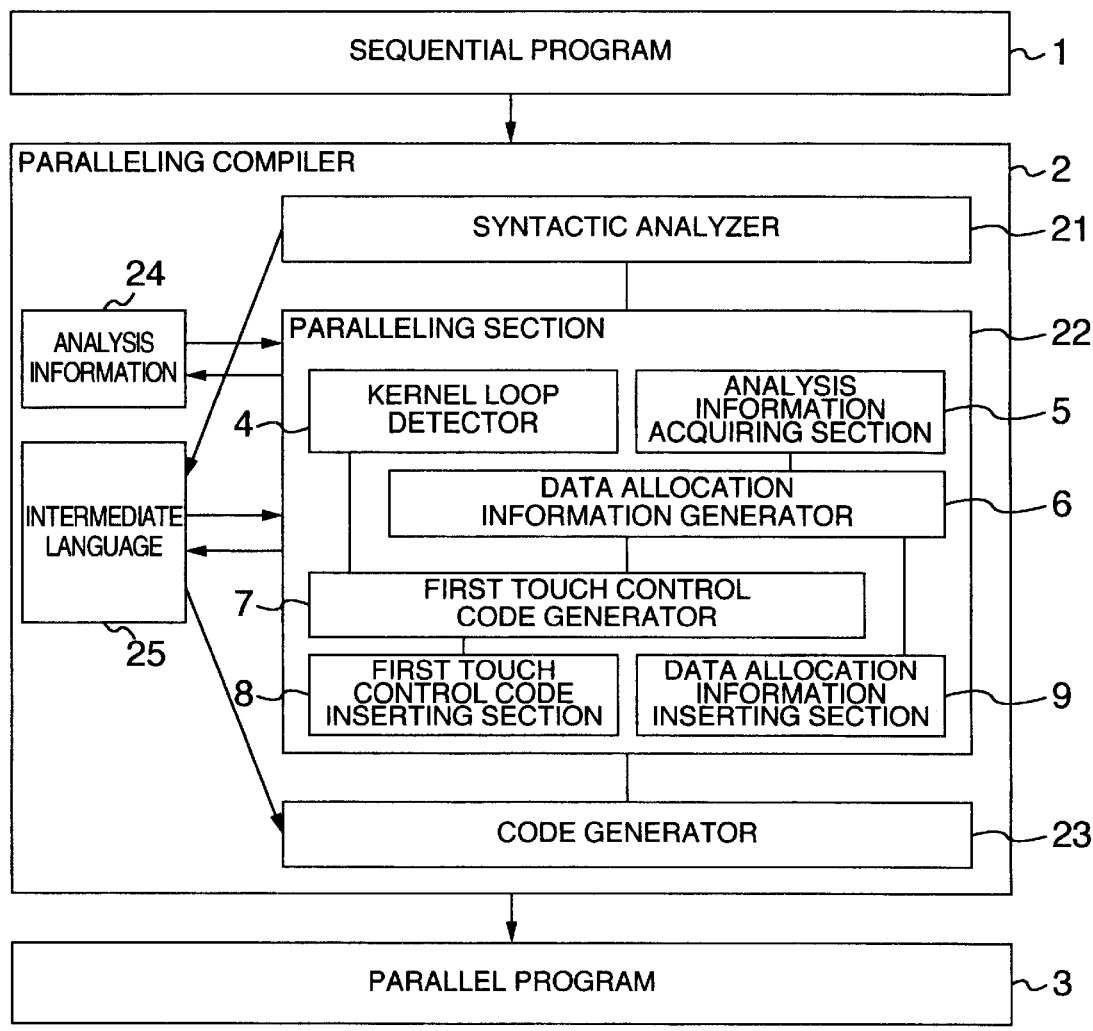

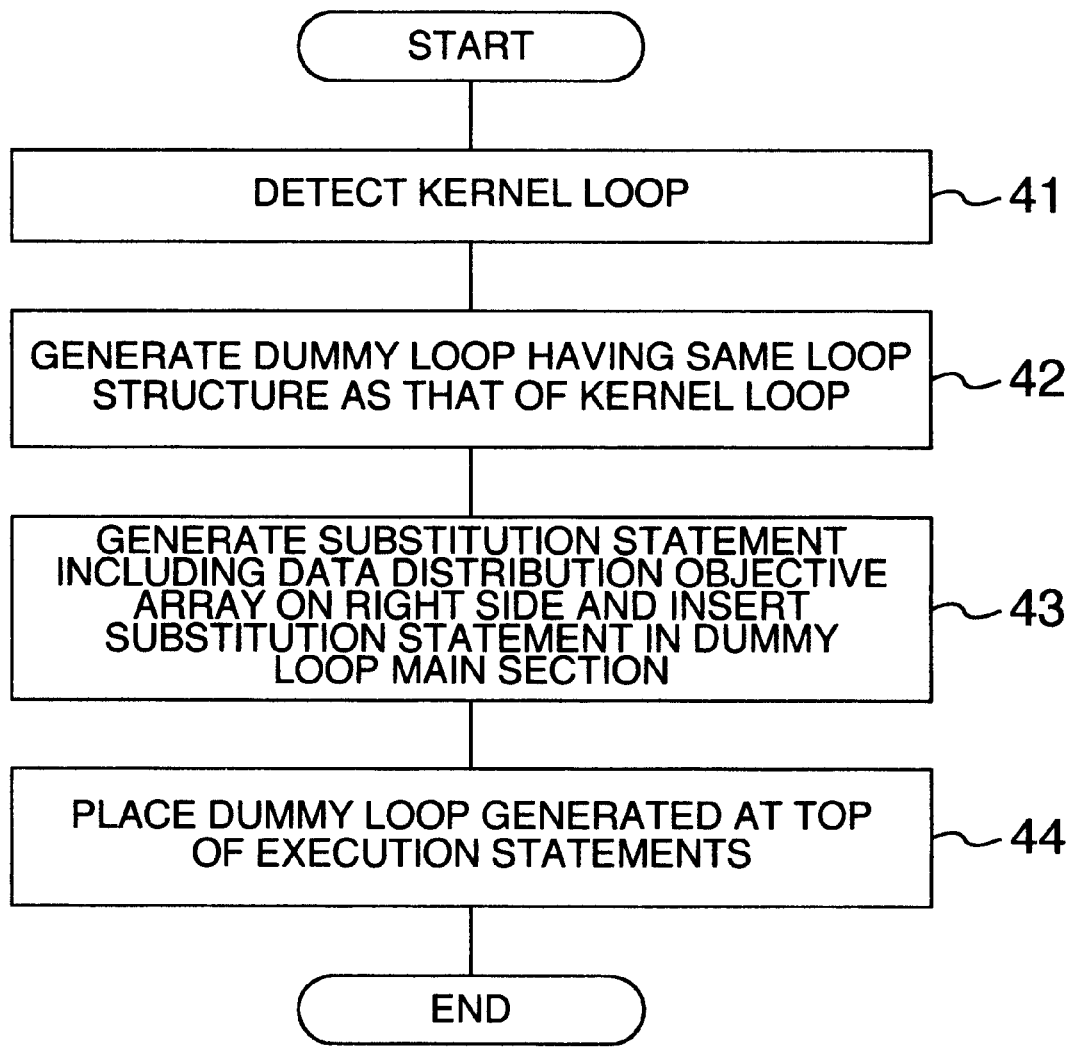

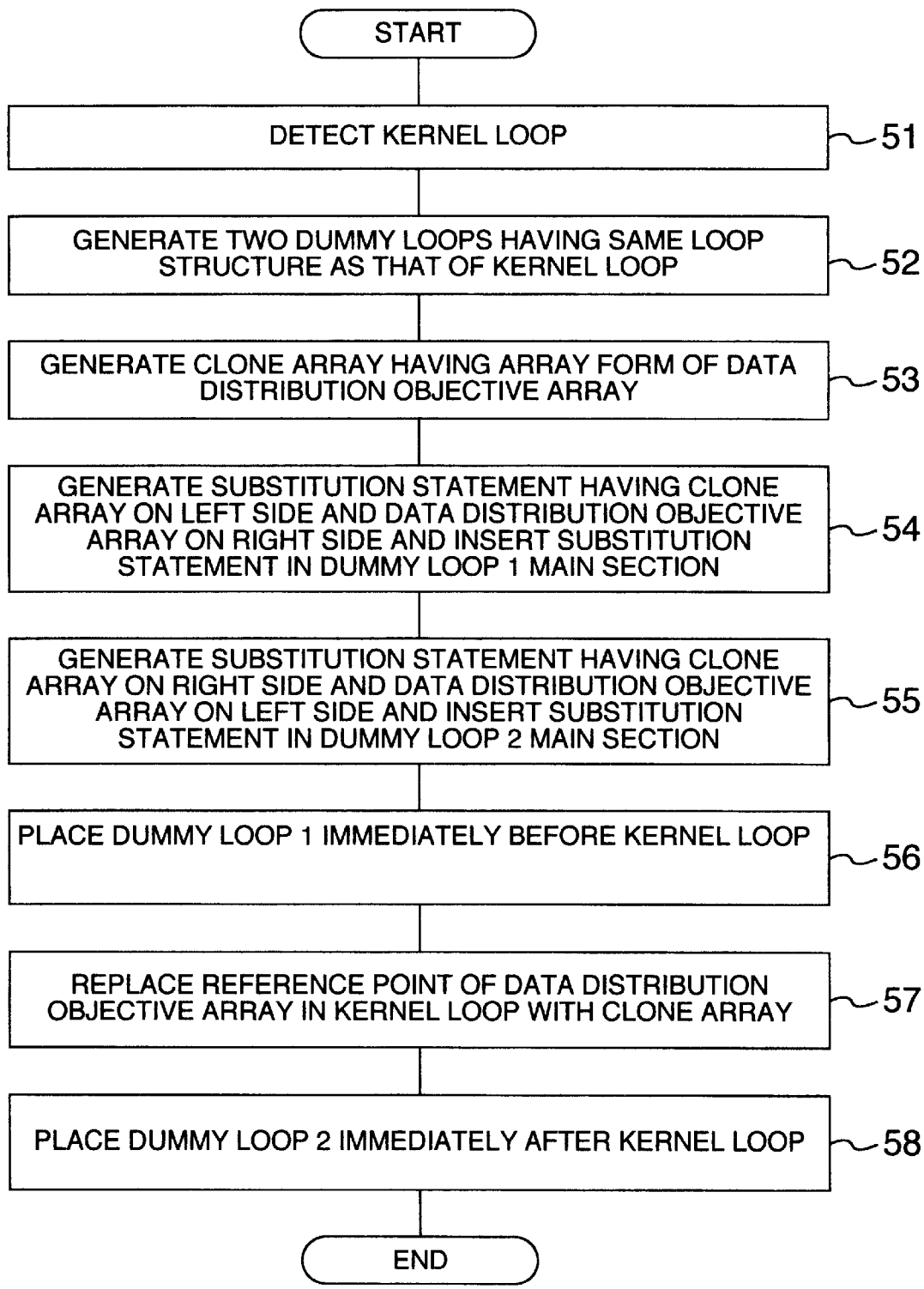

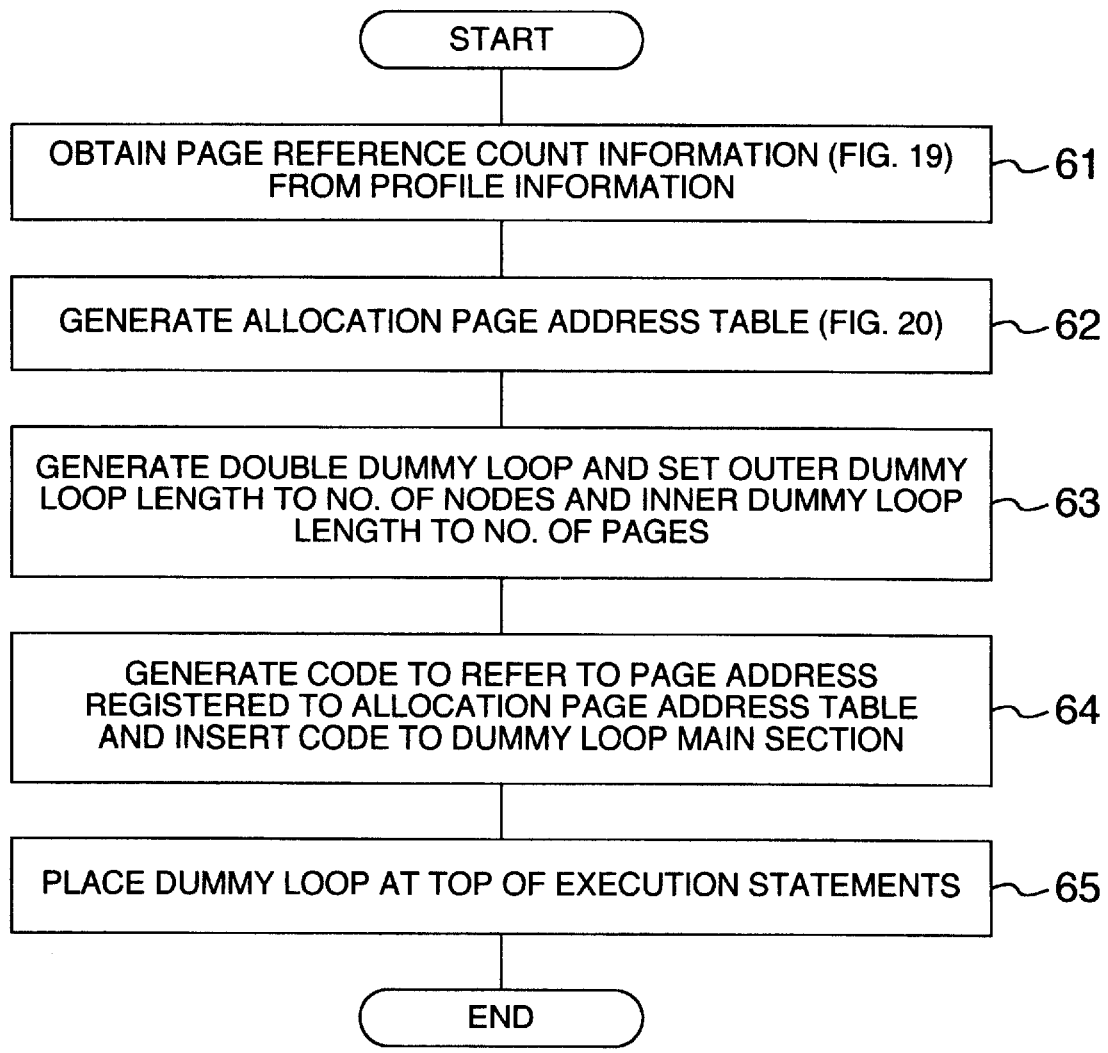

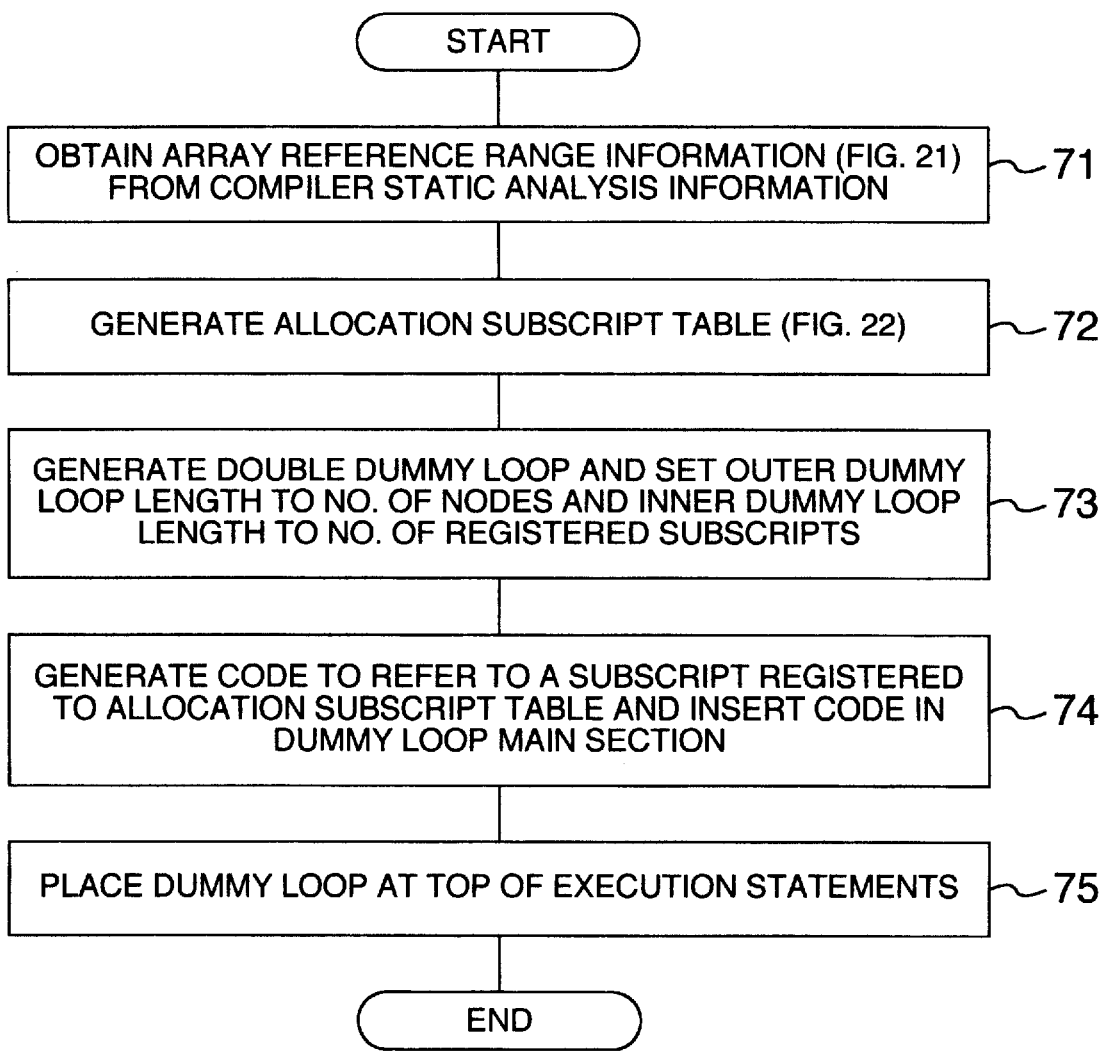

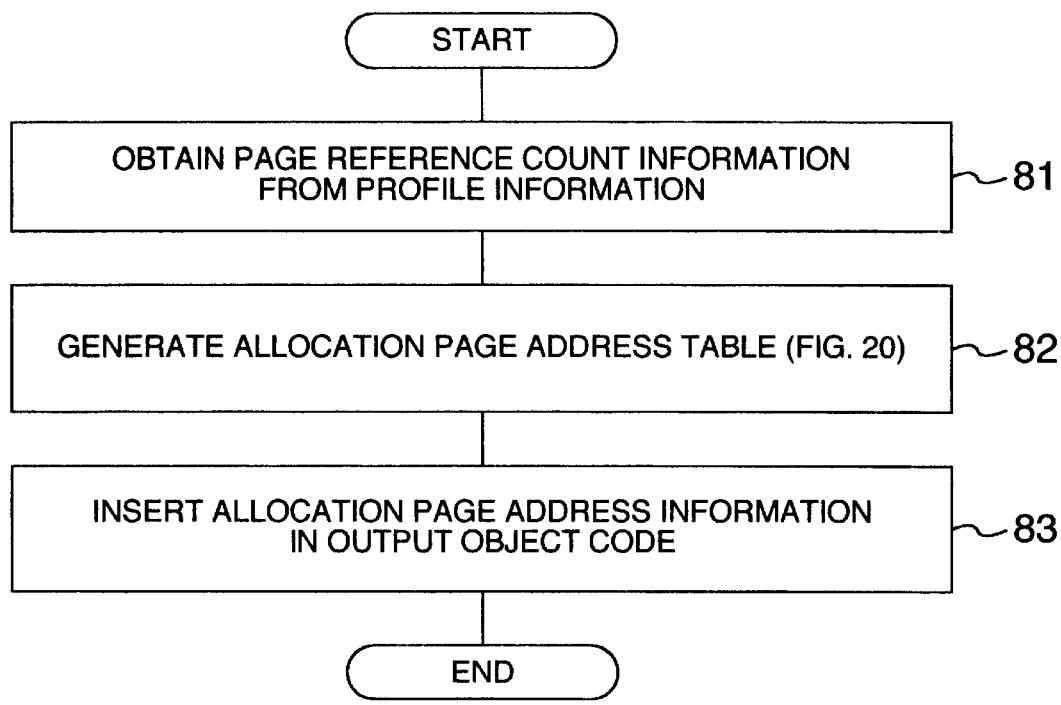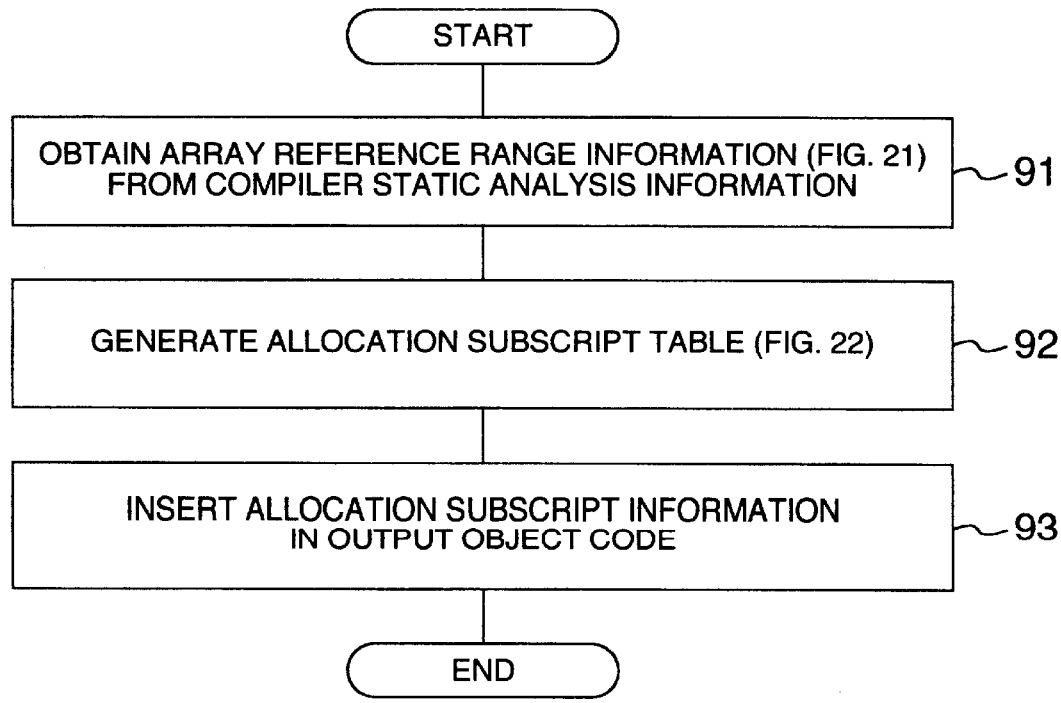

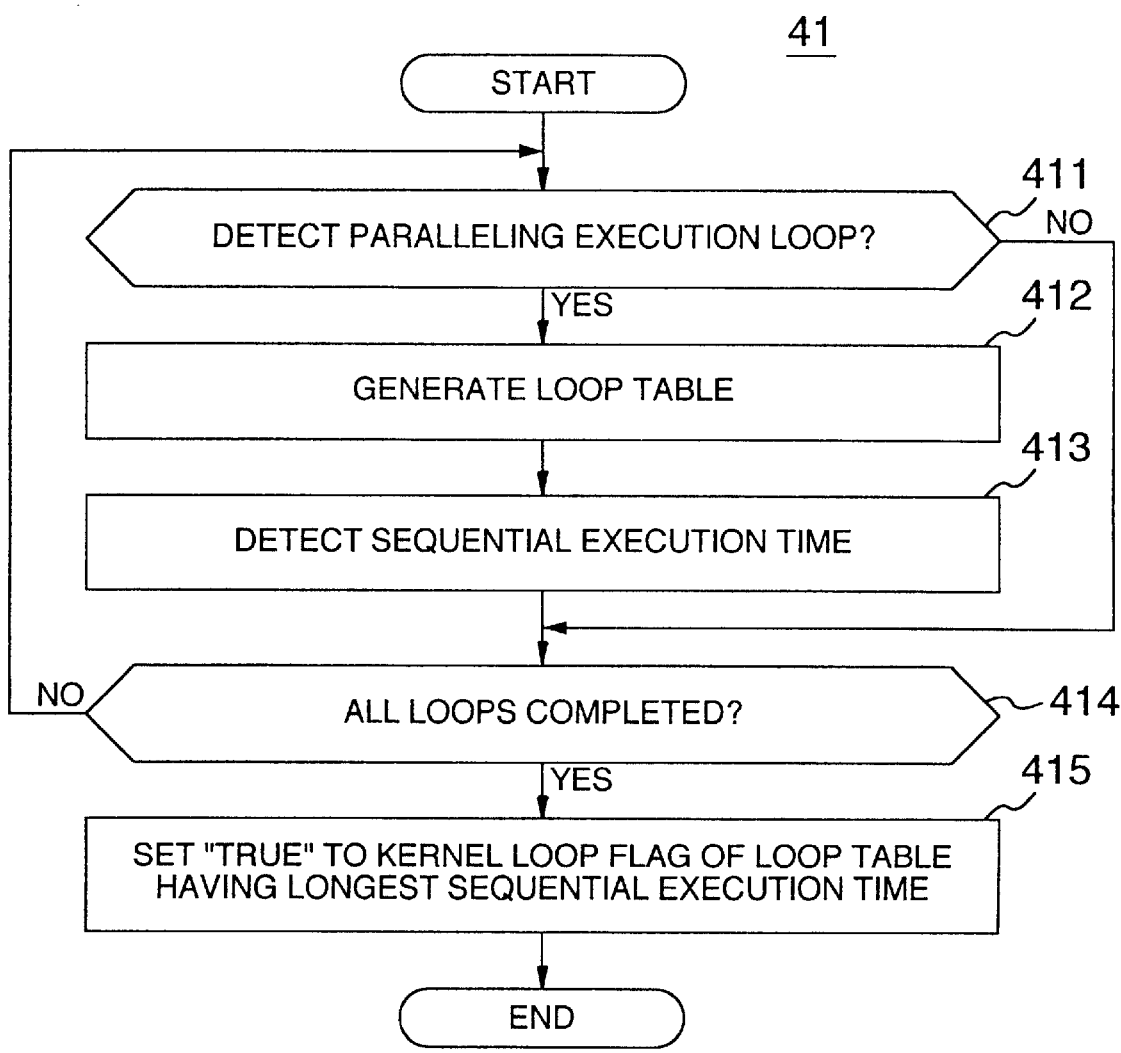

```
1 :   Program main
2 :   real A (100)
3 :   c $ ft1
      . . . . .
10 :  call init (A)
11 :  do itr=1, 10000
12 :     call kernel (A (41))
13 :  enddo
14 :  end 20 :  subroutine init (A)
21 :  real A (100)
22 :  c $ para
23 :  do i=1, 100
24 :     A (i)=0
25 :  enddo
26 :  return 30 :  subroutine kernel (A)
31 :  real A (60)
32 :  c $ para
33 :  do i=1, 60
34 :     A (i)=. . .
35 :  enddo
36 :  return
```

SIMPLE DATA
DISTRIBUTION
STATE

KERNEL LOOP
REFERENCE
RANGE

REMOTE
REFERENCE
RANGE

R: REMOTE REFERENCE
L: LOCAL REFERENCE

DATA DISTRIBUTION
STATE OF PRESENT
INVENTION

```
 1 : Program main
 2 : real A (100)
 3 : c $ ft5
 4 : c $ dist5 (A(41 : 55), 0)
 5 : c $ dist5 (A(56 : 70), 1)
 6 : c $ dist5 (A(71 : 75), 2)
 7 : c $ dist5 (A(76 : 100), 3)
     . . . .
10 : call init (A)
11 : do itr=1, 10000
12 :    call kernel (A (41))
13 : enddo
14 : end 20 : subroutine init (A)
21 : real A (100)
22 : c $ para
23 : do i=1, 100
24 :    A (i)=0
25 : enddo
26 : return 30 : subroutine kernel (A)
31 : real A (60)
32 : c $ para
33 : do i=1, 60
34 :    A (i)=. . .
35 : enddo
36 : return
```

```
 1 : Program main
 2 : real A (100)
     . . . . .
10 : call ft1 (A (41))
11 : call init (A)
12 : do itr=1, 10000
13 :     call kernel (A (41))
14 : enddo
15 : end 40 : subroutine ft1 (A)
41 : real A (60)
42 : c $ para
43 : do i=1, 60
44 :     =A (i)
45 : enddo
46 : return
```

```
 1 : Program main
 2 : real A (100), clone A (60)
     . . . . .
10 : call init (A)
11 : call ft21 (A (41), clone A)
12 : do itr=1, 10000
13 :     call kernel (clone A)
14 : enddo
15 : call ft22 (A (41), clone A)
16 : end 60 : subroutine ft21 (A, cloneA)
61 : real A (60), clone A (60)
62 : c $ para
63 : do i=1, 60
64 :     clone A (i)=A (i)
65 : enddo
66 : return 70 : subroutine ft22 (A, clone A)
71 : real A (60), clone A (60)
72 : c $ para
73 : do i=1, 60
74 :     A (i)=clone A (i)
75 : enddo
76 : return
```

```
 1 : Program main
 2 : real A (100)
 3 : call ft3
     . . . . .
10 : call init (A)
11 : do itr=1, 10000
12 :     call kernel (A (41))
13 : enddo
14 : end (LIBRARY AT EXECUTION)
50 : subroutine ft3
51 : c $ para
52 : do node=0, 3
53 :     do page=1, 3
54 :         load r1, table [node] [page]
55 :         load r2, MEM (r1)
56 :     enddo
57 : enddo
58 : return
```

```
 1 :  Program main
 2 :  real A (100)
      . . . . .
10 :  call ft4
11 :  call init (A)
12 :  do itr=1, 10000
13 :      call kernel (A (41))
14 :  enddo
15 :  end 30 :  subroutine ft4
31 :  c $ para
32 :  do node=0, 3
33 :      do ix=1, 3
34 :          =A (table (node, ix))
35 :      enddo
36 :  enddo
37 :  return
```

(OBJECT CODES)

| alloc-hint : |
|---|
| 0 : 320, 360, 400 ; |
| 1 : 440, 480, 500 ; |
| 2 : 540, 580, 620 ; |
| 3 : 660, 700, 740 ; |

36

(OBJECT CODES)

alloc-hint :
0 : A $ +41*8, A $ +46*8, A $ +51*8 ;
1 : A $ +56*8, A $ +61*8, A $ +66*8 ;
2 : A $ +71*8, A $ +76*8, A $ +81*8 ;
3 : A $ +86*8, A $ +91*8, A $ +96*8 ;

| | 811 | 812 | 813 | |
|---|---|---|---|---|
| TABLE NO. | 1 | 2 | 911 |
| NEXT POINTER | 2 | - | 912 |
| LOOP POINTER | 23 | 33 | 913 |
| KERNEL LOOP FLAG | false | true | 914 |
| FT CONTROL METHOD NO. | - | 1 | 915 |
| SEQUENTIAL EXECUTION TIME | 100 | 600000 | 916 |

FT: FIRST TOUCH

| PAGE ADDRESS | pe 0 | pe 1 | pe 2 | pe 3 | |
|---|---|---|---|---|---|
| ⋮ | ⋮ | ⋮ | ⋮ | ⋮ | ~931 |
| 320 | 50000 | 0 | 0 | 0 | ~932 |
| 360 | 50000 | 0 | 0 | 0 | ~933 |
| 400 | 50000 | 0 | 0 | 0 | ~934 |
| 440 | 0 | 50000 | 0 | 0 | ~935 |
| 480 | 0 | 50000 | 0 | 0 | ~936 |
| 520 | 0 | 50000 | 0 | 0 | ~937 |
| 560 | 0 | 0 | 50000 | 0 | ~938 |
| ⋮ | ⋮ | ⋮ | ⋮ | ⋮ | |

| pe 0 | pe 1 | pe 2 | pe 3 | |
|---|---|---|---|---|
| 320 | 440 | 560 | 680 | ~922 |
| 360 | 480 | 600 | 720 | ~923 |
| 400 | 520 | 640 | 760 | ~924 |

| pe 0 | pe 1 | pe 2 | pe 3 | |
|---|---|---|---|---|
| A (41 : 55) | A (56 : 70) | A (71 : 85) | A (86 : 100) | ~952 |

| pe 0 | pe 1 | pe 2 | pe 3 |
|---|---|---|---|
| 41 | 56 | 71 | 86 |
| 46 | 61 | 76 | 91 |
| 51 | 66 | 81 | 96 |

841, 842, 843, 844 (column labels); 941, 942, 943, 944 (row labels)

PARALLEL PROGRAM GENERATING METHOD

BACKGROUND OF THE INVENTION

The present invention relates to a method of generating by a paralleling computer a parallel program from a source program, and in particular, to a parallel program generating method capable of optimizing data locality using data distribution and a recording media on which a program of the method is stored.

As a method of a logically shared, physically distributed memory for a distributed shared memory parallel computer, there has been a method in which a virtual memory space to be logically shared among a plurality of processors (nodes) is subdivided into units called pages such that the pages are allocated to physically distributed memories of respective processors. To determine allocation of pages to the processors, there have been known two methods as follows.

A first data distribution method is called first touch method in which when data is first referred to, a page including the data is distributed to a memory of a processor which refers to the data.

In a second data distribution method, a data distribution indicating statement or sentence is explicitly used to specify a data distribution format.

Assume, for example, a sequential execution source program 11 shown in FIG. 9 is inputted. Assume that the system includes a distributed shared memory parallel computer including four processors and a page size is five array elements. Array elements are allocated to processors Pe0 to Pe3 according to first touch data distribution. Elements of array A are first referred to by a processor in an initialization loop (lines 23 to 25 of FIG. 9) of procedure init. Therefore, the elements of array A, i.e., A(1:25), A(26:50), A(51:75), and A(76:100) are allocated to pe0 to pe3, respectively. In this connection, pe0 to pe3 represent processors 0 to 3, respectively.

When the array elements are simply allocated according to an initialization loop first referred to by a processor as above, the data is distributed such that the elements 1:100 are equally distributed, i.e., 25 elements are distributed to each of processors pe0 to pe3.

On the other hand, when a data distribution indicating statement "c$distibute A(block)" is inserted in a program declarative section of a sequential execution source program (e.g., 1:25, 26:50, 51:75, and 76:100 are specified in lines 4 to 7 of FIG. 11, which will be described later), the data are equally distributed to processors pe0 to pe3 in the same way as for FIG. 10A.

The data distribution method of the first touch scheme and that using the data distribution indicating statement have been described, for example, in pages 334 to 345 of "Data Distribution Support on Distributed Shared Memory Multiprocessors" written by Rohit Chandra, Ding-Kai Chen, Robert Cox, Dror E. Maydan, Nedeljkovic, and Jennifer M. Anderson (Sigplan'97 Conference on Programming Language Design and Implementation (PLDI) Las Vegas, Nev., Jun. 15–18, 1997).

In the simple first touch data distribution method described above, if a data access pattern in the initialization loop does not match that in a kernel loop (a loop requiring a longest execution time among the loops in the entire program), when a parallel program obtained by converting a sequential execution source program is executed, data locality in the kernel loop is deteriorated. In the simple first touch scheme, this consequently is one of the causes which hinder improvement of the parallel program processing speed. For example, in a situation in which a program is equally distributed to four processors pe0 to pe3 as shown in FIG. 10A, when a subroutine of a kernel loop in which variable i in lines 33 to 35 of FIG. 9 ranges from one to 60 for repetitious processing is 10000 times repeatedly executed, if the elements of array A are not entirely allocated to the respective memories of processors pe which execute the processing, it is necessary to access a faraway memory location to acquire the elements. This resultantly lowers the processing speed.

Moreover, in the data distribution method using the simple data distribution indicating statement, there possibly exists data distribution which cannot be easily expressed by an indicating statement. Therefore, data cannot be optimally distributed. In such a situation, when the simple data distribution indicating statement is used, data locality is possibly deteriorated. This results in one of causes which prevent improvement of the processing speed of the parallel program generated.

For example, when sequential execution source program 11 shown in FIG. 9 is inputted to a compiler and is converted into a parallel program, if there are four processors and the first touch data distribution is adopted, elements of array A are allocated as shown in FIG. 10A by an initial loop (lines 23 to 25 of FIG. 9) of procedure init which first refers to array A. Namely, A(1:25), A(26:50), A(51:75), and A(76:100) are allocated to pe0 to pe3, respectively. However, a kernel loop (lines 33 to 35 of FIG. 9) of procedure kernel refers to array A in the following ranges, i.e., A(41:55), A(56:70), A(71:85), and A(86:100) for pe0 to pe3, respectively. As can be seen from FIG. 10C, (41:70) and (76:85) of array A are data reference objects assigned to another processor, namely, are associated with remote reference (R). Resultantly, 66.7% of all data reference is made through the remote reference (R). In the situation of FIG. 10B, local reference (L) to access data allocated to own processor takes place quite little, namely, only the entire data of processor pe3 and part of data of processor pe2 are accessed by local reference (L) In the data allocation employing a simple data distribution indicating statement, it is difficult to indicate data distribution shown in FIG. 10B.

SUMMARY OF THE INVENTION

It is therefore an object of the present invention to provide a parallel program generating method in which data is optimally distributed by the kernel loop to thereby improve data locality to increase the processing speed of the parallel program.

To achieve the object in accordance with the present invention, there is provided a parallel program generating method in which loops to be paralleled are detected and then a kernel loop is detected in the loops. Next, a first touch control code is generated and then the code is placed before a first execution loop of a main program, for example, before a first position of execution statements of the main program or the code is placed immediately before the kernel loop to thereby produce a parallel program. By this operation, when sequential execution source program 11 of FIG. 9 is inputted to a compiler, A(1:25) and A(41:55) are allocated to pe0, A(26:40) and A(56:70) are allocated to per1, and A(71:85) and A(86:100) are respectively allocated to pe2 to pe3 as shown in FIG. 10D. This improves data locality in the kernel loop and can resultantly increases the parallel program processing speed.

Additionally, in the parallel program generating method of the present invention, it is also possible that profile information, compiler static analysis information, or user indication information is obtained to generate a first touch control code such that a parallel program is generated by placing the code, for example, at a first position of execution statements.

Moreover, in the parallel program generating method of the present invention, it is also possible that profile information, compiler static analysis information, or user indication information is obtained to produce a page allocation information to generate a parallel program in which the page allocation information is inserted.

First, description will be given of terms used in the following embodiments and a correspondence thereof to drawings.

① A paralleling compiler (2 of FIG. 10 is a compiler which receives as an input thereto a sequential execution source program (1 of FIG. 10 described in a high level language and produces as an output therefrom a parallel program (3 of FIG. 3) for parallel execution.

② A program top version first touch control method is a method in which a dummy loop to reproduce a data access pattern of the kernel loop is placed, for example, at a first position of execution statements of the main program to control first touch data distribution (reference is to be made to FIG. 2; first embodiment).

③ A loop front version first touch control method is a method in which a dummy loop which copies, while producing a data access pattern of the kernel loop, data of a data distribution objective array onto a clone array having an array form of the data distribution objective array is placed immediately before the kernel loop to thereby control first touch data distribution (reference is to be made to FIG. 3; second embodiment).

④ A profile information version first touch control method is a method wherein a dummy loop which causes a processor, according to profile information, to refer to a page most frequently referred to by the processor is placed at a first position of execution statements of the main program to thereby control first touch data distribution (reference is to be made to FIG. 3; third embodiment). In this regard, profile information includes various information obtained by once executing, for example, a parallel program generated in a method of the background art and indicates the number of accesses of each processor to each page for reference.

⑤ A static analysis information version first touch control method is a method wherein a compiler generates a dummy loop which causes, according to static analysis information of the compiler, a processor to refer to a page including array elements to be allocated to the processor. The dummy loop is placed at a first position of execution statements of, for example, the main program to thereby control first touch data distribution (reference is to be made to FIG. 5; fourth embodiment). In this connection, static analysis information is analysis information which the compiler can automatically analyze.

⑥ A user indication information version first touch control method is a method wherein a dummy loop which causes, according to user indication information, a processor to refer to array elements of a page to be allocated to the processor is placed at a first position of, for example, execution statements to thereby control first touch data distribution (reference is to be made to FIG. 5; fifth embodiment). Incidentally, user indication information is information which is indicated by a user, e.g., a programmer having generated a sequential source program, the information not being analyzed by the compiler itself. This method may have a flow substantially equal to the flow of the static analysis information version first touch control method, and the processing is conducted by referring to an array reference range table or the like indicated by the user in place of the static analysis information.

⑦ A profile information version data distribution control method is a method in which for each page, information of a processor which most frequently refers to the page is obtained from profile information and is then inserted into an object code to thereby cause an operating system to optimally distribute data (reference is to be made to FIG. 6; sixth embodiment). In this method, the object code is inserted in a lower section of the program code such that the operating system (OS) allocates the data according to the object code.

⑧ A static analysis information version data distribution control method is a method in which information of pages to be allocated to each processor is obtained from the static analysis information of the compiler and is inserted into an object code to thereby cause an operating system to optimally distribute data (reference is to be made to FIG. 7; seventh embodiment). This method is different only in that the information is inserted into the object code using the static analysis information in place of the profile information.

⑨ A user indication information version data distribution control method is a method in which information of pages to be allocated to each processor is obtained from information indicated by a user and is then inserted into an object code to thereby cause an operating system to optimally distribute data (reference is to be made to FIG. 7; eighth embodiment). This method is different only in that the information is inserted into the object code using the user indication information in place of the static analysis information.

BRIEF DESCRIPTION OF THE DRAWINGS

FIG. 1 is a block diagram of a paralleling compiler showing an embodiment of the present invention;

FIG. 2 is a processing flowchart of a program top version first touch control method showing a first embodiment of the present invention;

FIG. 3 is a processing flowchart of a loop front version first version first touch control method showing a second embodiment of the present invention;

FIG. 4 is a processing flowchart of a profile information version first touch control method showing a third embodiment of the present invention;

FIG. 5 is a processing flowchart of a static analysis information version first touch control method and a profile information version first touch control method showing fourth and fifth embodiments of the present invention;

FIG. 6 is a processing flowchart of a profile information version data distribution control method showing a sixth embodiment of the present invention;

FIG. 7 is a processing flowchart of a static analysis information version data distribution control method and a user indication information version data distribution control method showing seventh and eighth embodiments of the present invention;

FIG. 8 is a processing flowchart to detect a kernel loop in accordance with the present invention;

FIG. 9 is an explanatory diagram (for other than the sixth embodiment) of a sequential execution source program as an input of the present invention;

FIG. 11 is an explanatory diagram (for the sixth embodiment) of a sequential execution source program as an input of the present invention;

FIG. 12 is an explanatory diagram (for the first embodiment) of a parallel execution source program as an output of the present invention;

FIG. 13 is an explanatory diagram (for the second embodiment) of a parallel execution source program as an output of the present invention;

FIG. 14 is an explanatory diagram (for the third embodiment) of a parallel execution source program as an output of the present invention;

FIG. 15 is an explanatory diagram (for the fourth embodiment) of a parallel execution source program as an output of the present invention;

FIG. 16 is an explanatory diagram (for the seventh embodiment) of an object program as an output of the present invention;

FIG. 19 is an explanatory diagram of a page reference count table used in the present invention;

FIG. 20 is an explanatory diagram of an allocation page address table used in the present invention;

FIG. 21 is an explanatory diagram of an array reference range table used in the present invention; and FIG. 22 is an explanatory diagram of an allocation subscript table used in the present invention.

DESCRIPTION OF THE EMBODIMENTS

Figure 10A:
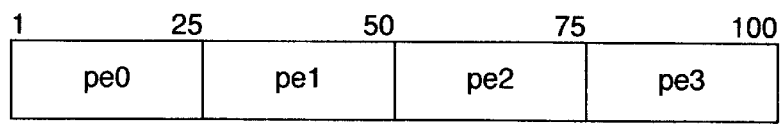
FIGS. 10A to 10D are explanatory diagrams of a data distribution state and a data reference range of array A.
Figure 10B:
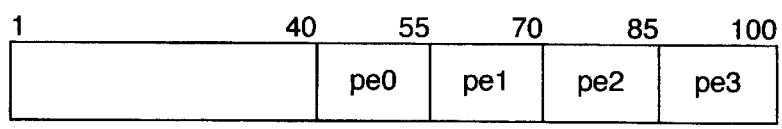
Figure 10C:
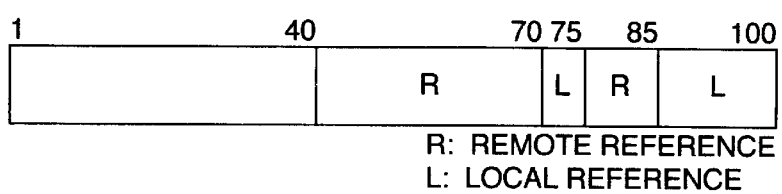
Figure 10D:
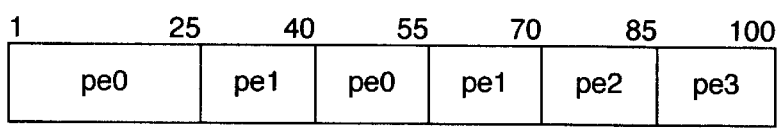

Referring now to the drawings, description will be given in detail of embodiments of the present invention.

FIG. 1 is a configuration diagram showing an embodiment of a paralleling compiler of the present invention.

The present invention is a function of a paralleling compiler 2 implemented on a computer, namely, a parallel program generating method in which compiler 2 receives as an input a sequential execution source program 1 and produces a parallel program 3.

In FIG. 1, compiler 2 receives as an input sequential execution source program 1 described in a high level language, produces and outputs parallel program 3 for parallel execution, and generates an intermediate language 25 during the processing. Incidentally, the output from compiler 2 is shown in a source program form in the following example. However, in general, the output is not limited to the source program form.

Compiler 2 includes a syntactic analysis section 21 which reads in source program 1 to syntactically analyze program 1 to generate intermediate language 25, a paralleling section 22 which detects a kernel loop of program 1 from intermediate language 25, generates a first touch control code, and inserts the code into intermediate language 25 to convert intermediate language 25 into intermediate language 25 for parallel processing thereof by a plurality of processors, and a code generator section 23 which generates and outputs a parallel program 3 using intermediate language 25 converted.

Furthermore, paralleling section 22 includes a kernel loop detector section 4 which detects a kernel loop having the longest sequential execution time from paralleling objective loops to distribute a range of repetition of loops in source program 1 inputted, an analysis information acquiring section 5 which obtains as analysis information 24 a number of references and an array reference range for each page obtained by concurrently executing the input program, a data allocation information generator section 6 to generate data allocation information of each processor using analysis information and a first touch control code generator section 7 to generate a code to control the first touch using analysis information 24, and a first touch control code inserting section 8 to insert a code to control the first touch and a data allocation information inserting section 9 to insert data allocation information. Program top version first touch control method FIG. 2 is an operation flowchart of a program top version first touch control method showing a first embodiment of the present invention.

A program top version first touch control method implemented by paralleling section 22 will be described according to FIG. 2. Description will be here given of an example in which sequential source program 11 shown in FIG. 9 is inputted to paralleling compiler 2. Section 22 detects all loops for execution of the paralleling in which a loop repetition range of program 11 inputted in processing step 41 is distributed. Among the loops, section 22 detects a kernel loop having the longest sequential execution time. Incidentally, step 41 is executed by kernel loop detector 4 shown in FIG. 1.

Figures 17, 18:
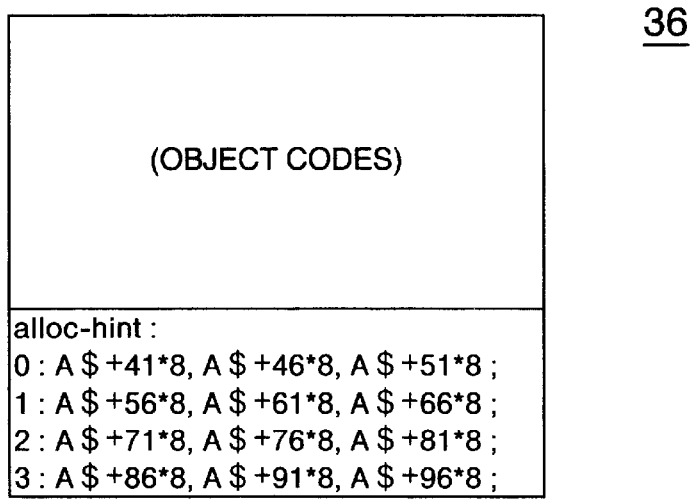
FIG. 17 is an explanatory diagram (for the eighth embodiment) of an object program as an output of the present invention.
FIG. 18 is an explanatory diagram of a loop table used in the present invention.

FIG. 8 is an operation flowchart of kernel loop detector 4 of FIG. 1 and FIG. 18 is a diagram of a loop table generated at kernel loop detection.

Referring to FIG. 8, description will be given of the kernel loop detection processing in step 41. First, in step 411, the program detects a loop paralleling indication statement, "c$para" in this case, in line number 22 of program 11 of FIG. 9 and then a paralleling execution loop of line numbers 23 to 25. Next, in step 412, the program generates a first loop table 812 shown in FIG. 18. Table 812 includes respective information items of a table number 911, a next table 912, a loop pointer 913, a kernel flag 914, a first touch control method number 915, and a sequential execution time 916. In this embodiment, the respective items of table 812 are set to values as follows, namely, "1" to table number 911, "not registered" to next table 912, "23" to loop pointer 913 (reference is to be made to line 23 of FIG. 9), "false" to kernel loop flag 914, "not registered" to method number 915, and "not registered (initial state of operation)" to time 916.

Next, in step 413, the program detects a sequential execution time for the pertinent loop (reference is to be made to line 23 of FIG. 9). The execution time is represented using a substitution statement as one unit, and since the loop iteration count is "100", 1×100=100 is obtained. Therefore, "100" is set to time 916 of table 812. Subsequently, a check is made in step 414 to determine whether or not another loop is present. Since another loop is present, processing returns to step 411 to repeatedly execute the processing above. In step 411, the program detects a loop paralleling indication statement, "c$para" indicated by line number 32 of program 11 and detects a paralleling execution loop of line numbers 33 to 35. Next, in step 412, the program generates a second loop table 813 shown in FIG. 18.

In this example, the respective items of table 813 are set to values as follows, namely, "2" to table number 911, "not registered" to next table 912, "33", to loop pointer 913, "false" to kernel loop flag 914, "not registered" to method number 915, "not registered" to time 916, and "2" to next table 912 of first loop table 812. Subsequently, in step 413, the sequential execution time is detected for the pertinent loop. The time is represented using a substitution statement as one unit, and since the loop iteration count is "60" in the procedure kernel procedure and the iteration count is "10000" for a loop including a procedure call statement of a procedure kernel in procedure main which have called the pertinent procedure kernel, 1×60×10000=600000 results. Consequently, "600000", is set to time 916 of table 813.

Thereafter, a check is made in step 414 to determine whether or not another loop is present. Since no loop is present, processing goes to step 415. In step 415, the program detects loop table 813 having the longest sequential execution time, sets "true" to flag 914 of table 813, and since an indication statement "c$ft1" indicating a program top version first touch control method is included in program 11, the program sets "1" to method number 915 of table 813 of FIG. 18 and then terminates the kernel loop detection processing.

FIG. 12 is a format diagram of an output program generated in the first embodiment. In this diagram, CALL statement of dummy loop ft1(A(41)) is placed immediately before CALL statement of initialization loop init(A).

Returning again to FIG. 2, in processing step 42, the program generates a dummy loop having a loop structure in which a nest (loop structure) and a loop length are the same as those of the kernel loop. In step 42, the dummy loop is generated as shown in line 43 of an output program 31 shown in FIG. 12. Subsequently, in processing step 43, the program generates a dummy substitution statement having data distribution objective array A on its right side as shown in line 44 of program 31 and inserts the statement in the dummy loop main section. The dummy substitution statement becomes a dummy reference point for a first touch in a page of array A. Incidentally, steps 42 and 43 are executed by generator 7 of FIG. 1. Next, in processing step 44, a procedure call statement of procedure ft1 generated is placed before an execution statement shown in line 10 of program 31 of FIG. 12, a real argument is specified as A(41) in association with a kernel procedure call in line 13. The argument indicates an element number of array A. In this connection, step 44 is executed by section 8 of FIG. 1. Loop front version first touch control method FIG. 3 is a processing flowchart of a parallel program generation method showing a second embodiment of the present invention, and FIG. 13 is a format diagram of an output program generated by a paralleling compiler.

Description will now be given of a processing flowchart of a parallel program generation method executed by paralleling section 22 of FIG. 1. In this paragraph, it is assumed that sequential source program 11 shown in FIG. 9 is inputted to the compiler. In section 22, the program detects paralleling execution loops to distribute a loop repetition range of program 11 to a plurality of processors and then a kernel loop having the longest sequential execution time among the paralleling execution loops. In this example, step 51 executes processing similar to that of step 41 described above and generates loop tables 812 and 813 shown in FIG. 18. Incidentally, step 51 is executed by detector 4 of FIG. 1. Next, in step 52, the program generates two dummy loops each having a loop structure of a nest and a loop length which are substantially equal to those of the kernel loop. Namely, in step 52, dummy loops respectively shown in lines 63 and 73 of an output program 32 shown in FIG. 13 are generated. Next, in step 53, clone array cloneA having an array form of data distribution objective array A is generated as shown in lines 61 and 71 of program 32. Subsequently, in processing step 54, the program generates a substitution statement having clone array cloneA shown in line 64 of program 32 on its left side and array A on its right side and then inserts the statement in a first dummy loop main section (line 64 of FIG. 13).

Thereafter, in processing step 55, the program generates a substitution statement having clone array cloneA shown in line 74 of program 32 on its right side and array A on its left side and then inserts the statement in a second dummy loop main section (line 74 of FIG. 13). In this regard, steps 52 to 55 are executed by generator 7 of FIG. 1. Next, in processing step 56, a procedure call statement of procedure ft21 generated is placed immediately before the kernel loop of program 32 as shown in line 11 of FIG. 32. Subsequently, in processing step 57, a real argument of the procedure call is replaced with clone array cloneA as shown in line 13 of program 32. Next, in processing step 58, the procedure call statement of procedure ft22 generated is placed immediately after the kernel loop as shown in line 15 of program 32, and then the loop front version first touch control method is terminated. As above, in the second embodiment, another linear array is generated as a clone array, data of array A is copied onto the clone array, an operation to be executed by the kernel loop is executed for the clone array, and then the data of the clone array is moved to the original array. By this operation, an array to be referred to by the kernel loop is cloneA, not array A. Therefore, CALL statement of ft22 is placed at a position after CALL statement of the initialization loop of array A, desired data distribution scheme can be obtained.

Incidentally, steps 56 to 58 are executed by section 8 of FIG. 1. profile information version first touch control method FIG. 4 is a processing flowchart of a parallel program generating method showing a third embodiment of the present invention and FIG. 14 is a format diagram of an output program created by a paralleling compiler.

Subsequently, description will be given of an outline of a profile information version first touch control method implemented by paralleling section 22 of FIG. 1. Profile information is information obtained by once executing a parallel program created by a compiler of the background art using a sequential execution source program. It is assumed here that sequential source program 11 shown in FIG. 9 is inputted to the compiler. In section 22, the program obtains profile information in processing step 61, i.e., a reference count table 241 indicating the number of references of each processor for each page in the form shown in FIG. 19. Incidentally, table 241 is included in analysis information 24 of FIG. 1, and step 61 is executed by section 5 of FIG. 1. Assume, for example, that the number of processors to concurrently execute program 11 is set to 4, a page size is equal to five array elements (eight bytes), i.e., 40 bytes, and array A (1:100) is allocated to address 0 to address 792 of a logically shared virtual memory address. Since the page size is 40 bytes, the first addresses of the respective pages are assigned with an interval of 40, namely, address 0, address 40, address 80, and so on. When program 11 is concurrently executed, the number of references of the page with first address "320" in the kernel loop is 50000 for pe0, 0 for pe1, 0 for pe2, and 0 for pe3. The number of references of each page similarly attained is registered to table 241.

Incidentally, table 241 includes information items of a page address 831, a number of pe0 references 832, a number of pe1 references 833, a number of pe2 references 834, a number of pe3 references 835; moreover, a reference number of each page such as a number of references 932 of each processor for each page with first address "320" and a number of references 933 of each processor for each page with first address "360". Next, in processing step 62, the program generates an allocation page address table 242 shown in FIG. 20 using the reference count table of FIG. 19. Table 242 of FIG. 20 includes a first address 821 of a page to which pe0 most frequently referred, a first address 822 of a page to which pe1 most frequently referred, a first address 823 of a page to which pe2 most frequently referred, and a first address 824 of a page to which pe3 most frequently referred. In this embodiment, page first addresses "320", "360", and "400" are registered to field 821 of FIG. 20, page first addresses "440", "480", and "520" are registered to field 822 of FIG. 20, page first addresses "560", "600", and "640" are registered to field 823 of FIG. 20, and page first addresses "680", "720", and "760" are registered to field 824 of FIG. 20.

In this connection, step 62 is executed by generator 6. Next, in processing step 63, the program generates a double dummy loop as shown in lines 52 to 57 of an output program 33 shown in FIG. 14 and then sets a loop range of an outer dummy loop of line 52 to "from 0 to 3" in association with the number of processors "4" and a loop length of an inner dummy loop of line 53 to the number of pages "3". Next, in processing step 64, the program generates an instruction code to refer to a page address registered to table 242 (FIG. 20) as shown in lines 54 and 55 of program 33 and inserts the code in a dummy loop main section. Incidentally, steps 63 and 64 are executed by generator 7 of FIG. 1. Next, in processing step 65, the program places a procedure call statement of procedure ft3 generated at a top of execution statements as shown in line 3 of program 33 and terminates the profile information version first touch control method. In this regard, step 65 is executed by section 8.

Static analysis information version first touch control method

FIG. 5 is a processing flowchart of a parallel program generating method showing a fourth embodiment of the present invention and FIG. 15 is a format diagram of an output program created by a paralleling compiler.

Next, description will be given of an outline of a static analysis information version first touch control method implemented by paralleling section 22 of FIG. 1. It is assumed here that sequential source program 11 shown in FIG. 9 is inputted to the compiler. In section 22, the program obtains profile information in processing step 71, i.e., an array reference range table 243 indicating an array reference range of each processor in the form shown in FIG. 21. Incidentally, table 243 is included in analysis information 24 of FIG. 1, and step 71 is executed by section 5 of FIG. 1. For example, when the number of processors to concurrently execute program 11 is four, the array reference range of each processor is registered to table 243 as follows, i.e., A(41:55) to pe0, A(56:70) to pe1, A(71:85) to pe2, A(86:100) to pe4. Next, in processing step 72, the program generates an allocation subscript table 244 as shown in FIG. 22 according to the array reference range table of FIG. 21. Table 244 of FIG. 22 includes information such as a first subscript 841 of a page to be referred to by pe0, a first subscript 842 of a page to be referred to by pe1, a first subscript 843 of a page to be referred to by pe2, and a first subscript 844 of a page to be referred to by pe3. In this embodiment, since the page size is five array elements, the pages to be referred to by pe0 are three pages, for example, with first subscripts "41", "46", and "51". Therefore, page first subscripts "41", "46", and "51" are registered to field 841 of FIG. 22.

Similarly, page first subscripts "56", "61", and "66" are registered to field 842 of FIG. 22, page first subscripts "71", "76", and "81" are registered to field 843 of FIG. 22, and page first subscripts "86", "91", and "96" are registered to field 844 of FIG. 22. In this connection, step 72 is executed by generator 6 of FIG. 1. Next, in processing step 73, the program generates a double dummy loop as shown in lines 32 to 36 of an output program 34 shown in FIG. 15 and then sets a loop range of an outer dummy loop of line 32 to "from 0 to 3" in association with the number of processors "4" and a loop length of an inner dummy loop of line 33 to the number of pages "3". Next, in processing step 74, the program generates an instruction code to refer to a subscript registered to table 244 and inserts the code in a loop main section. Incidentally, steps 73 and 74 are executed by generator 7 of FIG. 1. Next, in processing step 75, the program places a procedure call statement of procedure ft4 generated at a top of execution statements before initialization loop init(A) as shown in line 10 of program 34 and terminates the static analysis information version first touch control method. In this regard, step 75 is executed by section 8 of FIG. 1.

User indication information version first touch control method

Next, description will be given of parallel program generating method of a fifth embodiment of the present invention.

Referring to FIG. 5 used in the description of the fourth embodiment, description will be given of an outline of a user indication formation version first touch control method implemented by paralleling section 22. It is assumed here that sequential source program 12 shown in FIG. 11 is inputted to the compiler. The fifth embodiment differs from the fourth embodiment in that while the compiler analyzes by itself in the fourth embodiment, the compiler analysis is not required in the fifth embodiment by learning from a user. For example, when the user is a programmer herself or himself who have produced the sequential source program, it will be possible for the user to indicate data distribution without the compiler analysis.

In section 22, the program obtains, in place of results of processing step 71, user indication information, i.e., an array reference range table 243 indicating an array reference range of each processor in the form shown in FIG. 21. Incidentally, table 243 is included in analysis information 24 of FIG. 1, and this processing step is executed by section 5 of FIG. 1. In this embodiment, by the user indication statements in lines 4 to 7 of input program 12 (FIG. 110, the array reference range of each processor is registered to table 243 as follows, i.e., A(41:55) to pe0, A(56:70) to pe1, A(71:85) to pe2, A(86:100) to pe4. Next, the program executes steps 72 to 75 and then terminates the user indication information version first touch control method. In this regard, step 72 is executed by generator 6 of FIG. 1, steps 73 and 74 are executed by generator 7 of FIG. 1, and step 75 is executed by section 8 of FIG. 1. Profile information version data distribution control method FIG. 6 is a processing flowchart of a parallel program generating method showing a sixth embodiment of the present invention and FIG. 16 is a diagram of a table example added to an object code created by the sixth embodiment.

Subsequently, description will be given of an outline of a profile information version data distribution control method implemented by paralleling section 22 of FIG. 1. It is assumed here that sequential source program 11 shown in FIG. 9 is inputted to the compiler. In section 22, the program first obtains profile information in processing step 61, like in step 61 (FIG. 4), i.e., a reference count table 241 indicating the number of references of each processor for each page in the form shown in FIG. 19. Incidentally, table 241 is included in analysis information 24 of FIG. 1, and step 81 is executed by section 5 of FIG. 1. Next, the program generates an allocation page address table 242 shown in FIG. 20 in processing step 82 as in step 62 (FIG. 4). Incidentally, step 82 is executed by generator 6. Next, in step 83, the program inserts information of table 242 in an output object code 35 in the format shown in FIG. 16 and then terminates the profile information version data distribution control method. A portion of alloc_hint inserted in the object code is used as a hint to allocate pages when an operating system (OS) starts execution of the parallel program. For example, "320", "360", and "400" in line 1 means that pages specified by addresses "320", "360", and "400", are to be allocated to pe0. Incidentally, step 83 is executed by section 9 of FIG. 1. Static analysis information version data distribution control method FIG. 7 is a processing flowchart of a parallel program generating method showing a seventh embodiment of the present invention and FIG. 17 is a diagram of an additional code placed after an object code created by the seventh embodiment.

Next, description will be given of an outline of the static analysis information version data distribution control method implemented by paralleling section 22 of FIG. 1. It is assumed here that sequential source program 11 shown in FIG. 9 is inputted to the compiler. In section 22, the program obtains compiler static analysis information in processing step 91 as in step 71 (FIG. 5), i.e., an array reference range table 243 indicating an array reference range of each processor in the form shown in FIG. 21. Incidentally, table 243 is included in analysis information 24 of FIG. 1, and step 91 is executed by section 5 of FIG. 1. Next, in processing step 92 as in step 72 (FIG. 5), the program generates allocation subscript table 244 as shown in FIG. 22. Incidentally, step 92 is executed by generator 6. Next, in processing step 93, the program inserts information of table 244 in an output object code 36 in the form shown in FIG. 17 and then terminates the static analysis information version data distribution control method. In this regard, "$A+41*8" in the object code indicates an address higher than first address $A of array A by 41*8=328 bytes. "41" is an array subscript and "8" is a length of one element. Incidentally, step 93 is executed by section 9 of FIG. 1. This indicates that by specifying only an element number of array A, the operating system can determine a memory address to which the element is actually allocated. User indication information version data distribution control method Next, description will be given of parallel program generating method of an eighth embodiment of the present invention.

Referring to FIG. 7 used in the description of the seventh embodiment, description will be given of an outline of a user indication information version data distribution control method implemented by paralleling section 22. Incidentally, this embodiment differs from the seventh embodiment in that it is only necessary to set information in response to an indication from a user without acquiring information through a static analysis. It is assumed here that sequential source program 12 shown in FIG. 11 is inputted to the compiler. In section 22, the program obtains, in place of results of processing step 91, user indication information, i.e., an array reference range table 243 indicating an array reference range of each processor in the form shown in FIG. 21. Incidentally, table 243 is included in analysis information 24 of FIG. 1, and this processing step is executed by section 5 of FIG. 1. Next, the program executes steps 92 and 93 and then terminates the user indication formation version data distribution control method. Incidentally, step 92 is executed by generator 6 of FIG. 1 and step 93 is executed by section 9 of FIG. 1. By disposing a table after the object code as shown in FIG. 17, the operating system allocates data according to the table.

Description has been given of the first to eighth embodiments. By converting these steps into programs, there are obtained the respective parallel program generating compilers. By storing each compiler on a recording media such as a compact disc read-only memory (CD-ROM) or a magnetic disk, the recording media can be installed in a computer placed at a desired location to be executed by the computer, which leads to implementation of the present invention.

What is claimed is:

1. A parallel program generating method of generating by a paralleling compiler computer a parallel program for a distributed shared memory parallel computer including a plurality of processors, comprising the steps of:

receiving as an input a sequential execution program, conducting a syntactic analysis for the program, and producing an intermediate language;

transforming the intermediate language into items for parallel processing; and receiving as an input the intermediate language and producing a parallel execution program, wherein the step of transforming the intermediate language into items for parallel processing includes the steps of:

receiving as an input the intermediate language and detecting, among paralleling execution loops for which a loop iteration range is to be distributed, a kernel loop having a longest sequential execution time, generating a control code to reproduce, in a data access pattern substantially equal to a data access pattern of the kernel loop, a first touch data distribution in a data distribution method of the distributed shared memory parallel computer, the distribution allocating, when data is first referred to by a processor, one consecutive area of a memory including the data to a physical memory of the processor having referred to the data, and inserting the control code in the parallel program at a position before a first execution loop thereof.

2. A parallel program generating method according to claim 1, wherein the control code insertion step includes a step of inserting the control code in the parallel program at a top of execution statements thereof.

3. A parallel program generating method of generating by a paralleling compiler computer a parallel program for a distributed shared memory parallel computer including a plurality of processors, comprising the steps of:

receiving as an input a sequential execution program, conducting a syntactic analysis for the program, and producing an intermediate language;

transforming the intermediate language into items for parallel processing; and receiving as an input the intermediate language and producing a parallel execution program, wherein the step of transforming the intermediate language into items for parallel processing includes the steps of:
  receiving as an input the intermediate language and detecting, among paralleling execution loops for which a loop iteration range is to be distributed, a kernel loop having a longest sequential execution time,
  generating a first control code to reproduce a first touch data distribution in a data distribution method of the distributed shared memory parallel computer by assigning data of a kernel array referred to by a loop main section of the kernel loop in a clone array having an array configuration substantially equal to an array configuration of a kernel array, the distribution allocating, when data is first referred to by a processor, one consecutive area of a memory including the data to a physical memory of the processor having referred to the data,
  placing the first control code at a position immediately before the kernel loop,
  generating a second control code to assign the data of the clone array in the kernel array, and
  placing the second control code at a position immediately after the kernel loop.

4. A parallel program generating method of generating by a paralleling compiler computer a parallel program for a distributed shared memory parallel computer including a plurality of processors, comprising the steps of:
  receiving as an input a sequential execution program, conducting a syntactic analysis for the program, and producing an intermediate language;
  transforming the intermediate language into items for parallel processing; and
  receiving as an input the intermediate language and producing a parallel execution program,
  wherein the step of transforming the intermediate language into items for parallel processing includes the steps of:
    receiving as an input the intermediate language and acquiring as profile information a number of referring operations of each processor to each consecutive area on a memory, the number obtained by concurrently executing an input program,
    generating a control code to control a first touch data distribution in a data distribution method of the distributed shared memory parallel computer by allowing a processor to access a consecutive area in each memory, the processor having a highest value of the number of referring operations in the memory, the distribution allocating, when data is first referred to by a processor, one consecutive area of a memory including the data to a physical memory of the processor having referred to the data, and
    inserting the control code in the parallel program at a position before a first execution loop thereof.

5. A parallel program generating method according to claim 4, wherein the control code insertion step includes a step of inserting the control code in the parallel program at a top of execution statements thereof.

6. A parallel program generating method of generating by a paralleling compiler computer a parallel program for a distributed shared memory parallel computer including a plurality of processors, comprising the steps of:
  receiving as an input a sequential execution program, conducting a syntactic analysis for the program, and producing an intermediate language;
  transforming the intermediate language into items for parallel processing; and
  receiving as an input the intermediate language and producing a parallel execution program,
  wherein the step of transforming the intermediate language into items for parallel processing includes the steps of:
    receiving as an input the intermediate language and acquiring a referring range for each processor of a kernel loop attained from static analysis information of the compiler or an indication information of a user,
    generating a control code to control a first touch data distribution in a data distribution method of the distributed shared memory parallel computer by allowing each processor to refer to a consecutive area in each memory desired to be allocated thereto according to the referring range obtained, the distribution allocating, when data is first referred to by a processor, one consecutive area of a memory including the data to a physical memory of the processor having referred to the data, and
    inserting the control code in the parallel program at a position before a first execution loop thereof.

7. A parallel program generating method according to claim 6, wherein the control code insertion step includes a step of inserting the control code in the parallel program at a top of execution statements thereof.

8. A parallel program generating method of generating by a paralleling compiler computer a parallel program for a distributed shared memory parallel computer including a plurality of processors, comprising the steps of:
  receiving as an input a sequential execution program, conducting a syntactic analysis for the program, and producing an intermediate language;
  transforming the intermediate language into items for parallel processing; and
  receiving as an input the intermediate language and producing a parallel execution program,
  wherein the step of transforming the intermediate language into items for parallel processing includes the steps of:
    receiving as an input the intermediate language and acquiring as profile information a number of referring operations of each processor to each consecutive area on a memory, the number obtained by concurrently executing an input program,
    generating, according to the number of referring operations of each processor, an information table of processors having largest numbers of referring operations to each of the consecutive areas on the memory, and
    inserting the information table in an object code of the parallel program and thereby passing allocation information of the consecutive areas on the memory to an operating system, the information including combinations of consecutive area numbers and processor numbers.

9. A parallel program generating method of generating by a paralleling compiler computer a parallel program for a distributed shared memory parallel computer including a plurality of processors, comprising the steps of:
  receiving as an input a sequential execution program, conducting a syntactic analysis for the program, and producing an intermediate language;
  transforming the intermediate language into items for parallel processing; and receiving as an input the intermediate language and producing a parallel execution program, wherein the step of transforming the intermediate language into items for parallel processing includes the steps of:

receiving as an input the intermediate language and acquiring a referring range for each processor of a kernel loop attained from static analysis information of the compiler or an indication information of a user, generating, according to the referring range for each processor, an information table indicating for each consecutive area on memory a processor to which the memory is to be allocated, and inserting the information table in an object code of the parallel program and thereby passing page allocation information to an operating system, the information including combinations of consecutive area numbers and processor numbers.

10. A recording medium on which a computer readable paralleling compiler is recorded, the compiler including the steps of claim 1.

11. A parallel program generating method of processing a sequential execution source program by a paralleling compiler computer and thereby generating a parallel program for a distributed shared memory parallel computer including a plurality of processors, comprising the steps of:

syntactically analyzing the source program;

detecting, according to a result of the syntactic analysis, a kernel loop having a longest sequential execution time in paralleling execution loops for which a loop repetition range is to be distributed to a plurality of processors;

generating a dummy loop having a data access pattern substantially equal to a data access pattern of the kernel loop; and inserting an execution statement of the dummy loop in the parallel program at a position before a first execution loop thereof.

12. A parallel program generating method according to claim 11, the dummy insertion step includes a step of inserting the dummy loop in the parallel program at a top of execution statements thereof.

13. A paralleling compiler computer to process a sequential execution source program and thereby to generate a parallel program for a distributed shared memory parallel computer including a plurality of processors, comprising:

a processing unit for syntactically analyzing the source program;

a processing unit for detecting, according to a result of the syntactic analysis, a kernel loop having a longest sequential execution time in paralleling execution loops for which a loop repetition range is to be distributed to a plurality of processors;

a processing unit for generating a dummy loop having a data access pattern substantially equal to a data access pattern of the kernel loop; and a processing unit for inserting an execution statement of the dummy loop in the parallel program at a position before a first execution loop thereof.

14. A recording medium on which a computer readable paralleling compiler is recorded, the compiler processing a sequential execution source program and thereby generating a parallel program for a distributed shared memory parallel computer including a plurality of processors, wherein the compiler includes:

a processing unit for syntactically analyzing the source program;

a processing unit for detecting, according to a result of the syntactic analysis, a kernel loop having a longest sequential execution time in paralleling execution loops for which a loop repetition range is to be distributed to a plurality of processors;

a processing unit for generating a dummy loop having a data access pattern substantially equal to a data access pattern of the kernel loop; and a processing unit for inserting an execution statement of the dummy loop in the parallel program at a position before a first execution loop thereof.

* * * * *